(12) United States Patent
Wilson

(10) Patent No.: US 6,339,380 B1
(45) Date of Patent: Jan. 15, 2002

(54) ELECTRONIC OVER STRESS DETECTOR CIRCUIT FOR MAGNETORESISTIVE DEVICES IN DATA STORAGE DEVICES SUCH AS DISC DRIVES

(75) Inventor: David Robert Wilson, Platteville, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/546,350

(22) Filed: Apr. 7, 2000

Related U.S. Application Data

(60) Provisional application No. 60/150,722, filed on Aug. 25, 1999.

(51) Int. Cl.$^7$ .............................................. G08B 21/00
(52) U.S. Cl. ..................... 340/663; 340/662; 340/635; 324/537; 324/763
(58) Field of Search ................................ 340/663, 662, 340/660, 657, 635; 324/537, 763, 764; 360/46, 66, 67

(56) References Cited

U.S. PATENT DOCUMENTS

| | | | |
|---|---|---|---|
| 5,465,186 A | 11/1995 | Bajorek et al. | 360/113 |
| 5,491,605 A | 2/1996 | Hughbanks et al. | 360/113 |
| 5,589,777 A | 12/1996 | Davis et al. | 324/537 |
| 5,598,118 A | 1/1997 | Koifman et al. | 327/108 |
| 5,603,043 A | 2/1997 | Taylor | 395/800 |
| 5,610,931 A | 3/1997 | Huang | 372/38 |
| 5,633,780 A | 5/1997 | Cronin | 361/220 |
| 5,748,399 A | 5/1998 | Gill | 360/66 |
| 5,812,357 A | 9/1998 | Johansen et al. | 361/212 |
| 5,959,827 A | 9/1999 | Smith et al. | 361/212 |
| 5,969,523 A | 10/1999 | Chung et al. | 324/252 |
| 6,014,030 A | 1/2000 | Smith et al. | 324/705 |
| 6,134,060 A | * 10/2000 | Ryat | 360/46 |

* cited by examiner

Primary Examiner—Edward Lefkowitz
(74) Attorney, Agent, or Firm—John R. Wahl; Merchant & Gould

(57) ABSTRACT

The circuit in accordance with the present invention monitors current signals between the preamplifier and the transducer in a data storage device such as a disc drive utilizing magnetoresistive transducers and/or giant magnetoresistive transducers. The detector circuit includes an amplitude section, a duration section, a frequency section, and an alarm section. The amplitude section has a comparator for detecting when a signal exceeds a predetermined voltage level. The duration section measures the time period that the comparator has an output signal. The frequency section measures the frequency of occurrence of comparator output signals. Each of the sections provides an input to the alarm section which provides an alarm signal condition if the amplitude section magnitude is too high, or the duration times amplitude is too high, or the frequency of occurrences of events is too high.

15 Claims, 3 Drawing Sheets

US 6,339,380 B1

ELECTRONIC OVER STRESS DETECTOR CIRCUIT FOR MAGNETORESISTIVE DEVICES IN DATA STORAGE DEVICES SUCH AS DISC DRIVES

RELATED APPLICATIONS

This application claims the benefit of priority of U.S. Provisional Patent Application Serial No. 60/150,722, filed Aug. 25, 1999.

FIELD OF THE INVENTION

This invention generally relates to data storage devices and more particularly to protection of magnetoresistive heads and giant magnetoresistive heads and other sensitive devices from electronic over stress conditions.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is written to the magnetizable medium on the discs in a plurality of concentric circular tracks typically by an array of transducers mounted on the trailing end of "heads" and carried by a radial actuator for movement of the heads relative to the discs. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment.

Magnetoresistive (MR) transducers or heads, and more recently, giant magnetoresistive (GMR) transducers are typically formed by building layers by vapor deposition techniques on a head substrate. These layers which make up the transducers are extremely thin. As a result, they are extremely sensitive to static charge discharge events, and other electrical transients that can destroy or partially destroy the thin barriers between the element layers and/or between the layers and the substrate. Currently, only complete destruction of the layer integrity is detectable during the drive manufacturing process. Testing of the heads is performed periodically during the assembly stages to detect failed heads thus cutting down on the number of completed drives that fail. However, with the advent of smaller and smaller transducers, and the use of GMR heads, there has been an increased incidence of inoperable drive returns. These inoperative drives have passed the rigorous testing during manufacture and yet are still failing. Analysis of these drives shows that the heads failed not because of a catastrophic event, but because of weakening of the layer integrity. The cost of handling returned drives is high. Consequently, extreme care and expensive procedures have been taken to reduce such failures and testing frequencies have been increased. However, some of the failures continue to occur, even though the drives test satisfactorily during manufacture.

Accordingly, there is a need for device that can detect precursors to these electronic over stress conditions before they become significant and potentially damage the transducer.

SUMMARY OF THE INVENTION

Against this backdrop the present invention has been developed. The signals from the heads or between the preamplifier and the heads are monitored during the production stages. A number of electrical events may occur during the drive assembly process which are larger than normal yet smaller than that necessary to cause head failure at the time that the transient occurs. These signals have been detected and measured. The detection circuit in accordance with the present invention senses these signals on the line between the head and the preamplifier and monitors the energy content of the signals, and triggers an alarm condition if the energy content and or frequency of occurrence exceeds predetermined limits. Following manufacture, the detector circuit can be queried as to whether any alarm conditions have been sensed. If so, the drive can be rejected even though failure has not actually occurred or been indicated.

The circuit in accordance with the present invention monitors current signals between the preamplifier and the head and includes an amplitude section, a duration section, a frequency section, and an alarm section. The amplitude section has a comparator for detecting when a voltage transient exceeds a predetermined voltage value. The duration section measures the time period that the comparator has an output signal. The frequency section measures the frequency of occurrence of comparator output signals. Each of the sections provides an input to the alarm section which provides an alarm signal condition if the amplitude section magnitude is too high, or the duration times amplitude is too high, or the frequency of occurrences of events is too high.

These and various other features as well as advantages which characterize the present invention will be apparent from a reading of the following detailed description and a review of the associated drawings.

DETAILED DESCRIPTION

Figure 1:
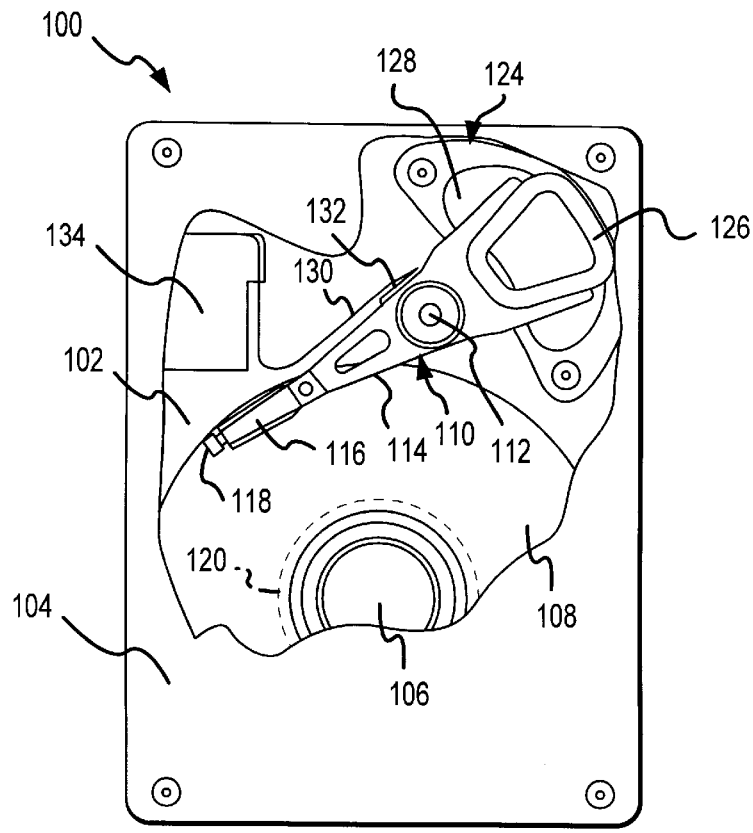
FIG. 1 is a plan view of a disc drive incorporating a preferred embodiment of an electrical over stress detector in accordance with the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
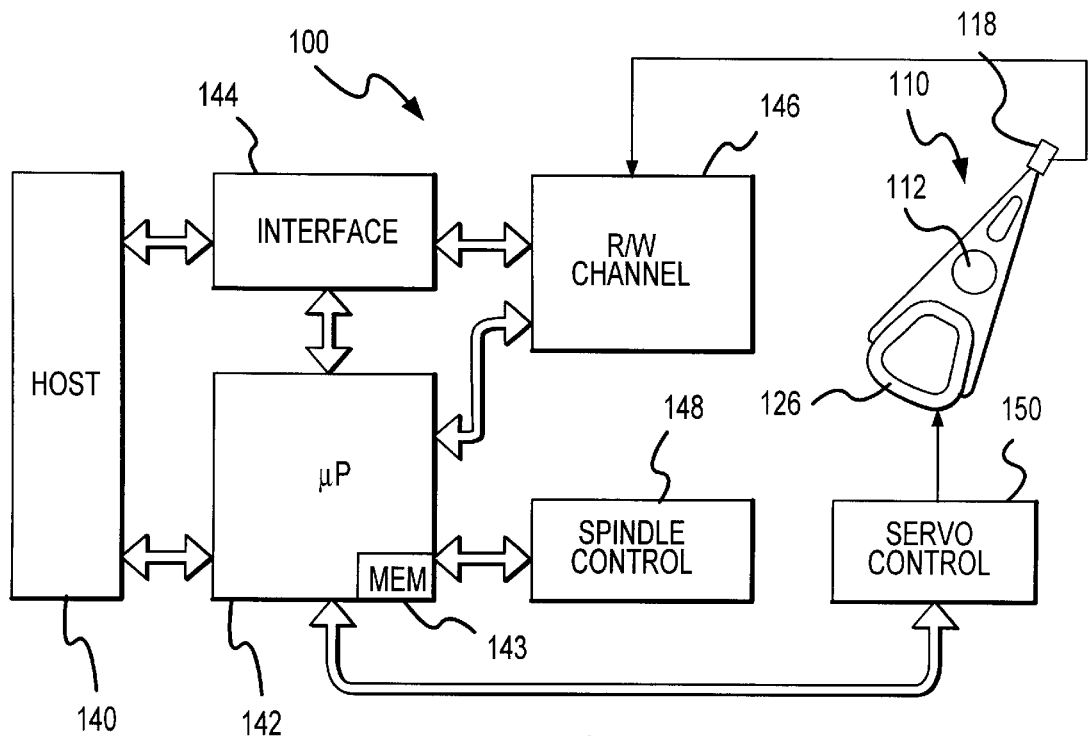
FIG. 2 is a simplified functional block diagram of the disc drive shown in FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 143, of the plant to generate the response of the servomechanism to a high frequency stimulus to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
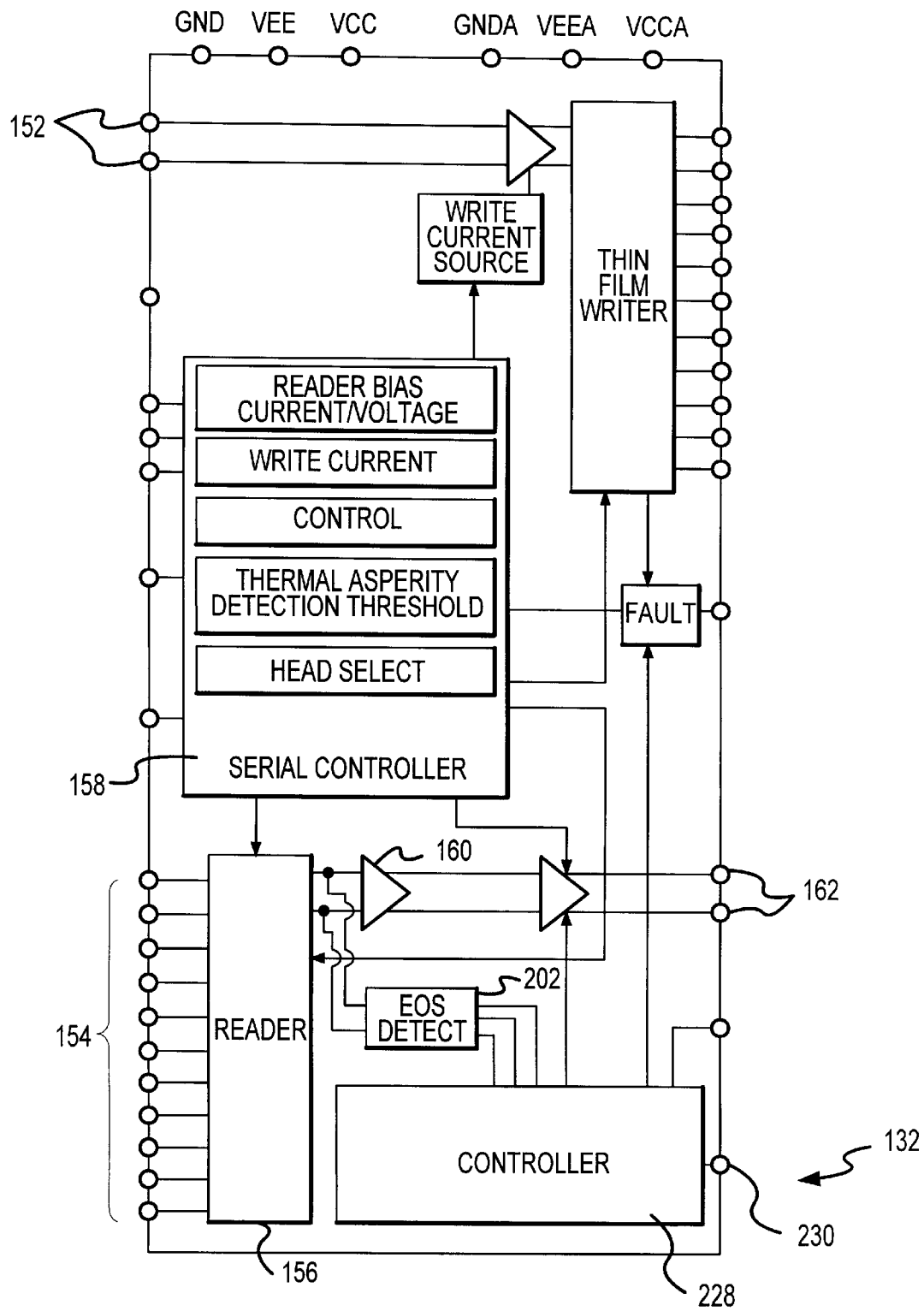
FIG. 3 is a block diagram of the preamplifier circuit incorporating the electrical over stress detector in accordance with the present invention.

In the drive 100 of the present invention, each of the heads 118 carries a magnetoresistive (MR) transducer or a giant magnetoresistive (GMR) transducer 200 on a trailing edge surface of the head 118. The transducer 200 is formed on the trailing edge surface by well known photo-deposition techniques. The head wires (not shown) electrically connect the transducer 200 on its head 118 to the preamplifier circuit 132. A block diagram of the preamplifier integrated circuit is shown in FIG. 3. The preamplifier 132 receives write signals on line 152 from the printed circuit board of the read/write channel 146 on the printed circuit board and receives read signals from the heads 118 and thus the transducers 200 on lines 154. The lines 154 provide input to a reader block 156. The read and write signals are controlled via a serial controller 158. The output of the reader 156 passes through an amplifier 160 and passes from the preamplifier 132 to the microprocessor on read output lines 162. The output of the reader block 156 also feeds the electrical over stress (EOS) detector circuit 202 in accordance with the present invention.

Figure 4:
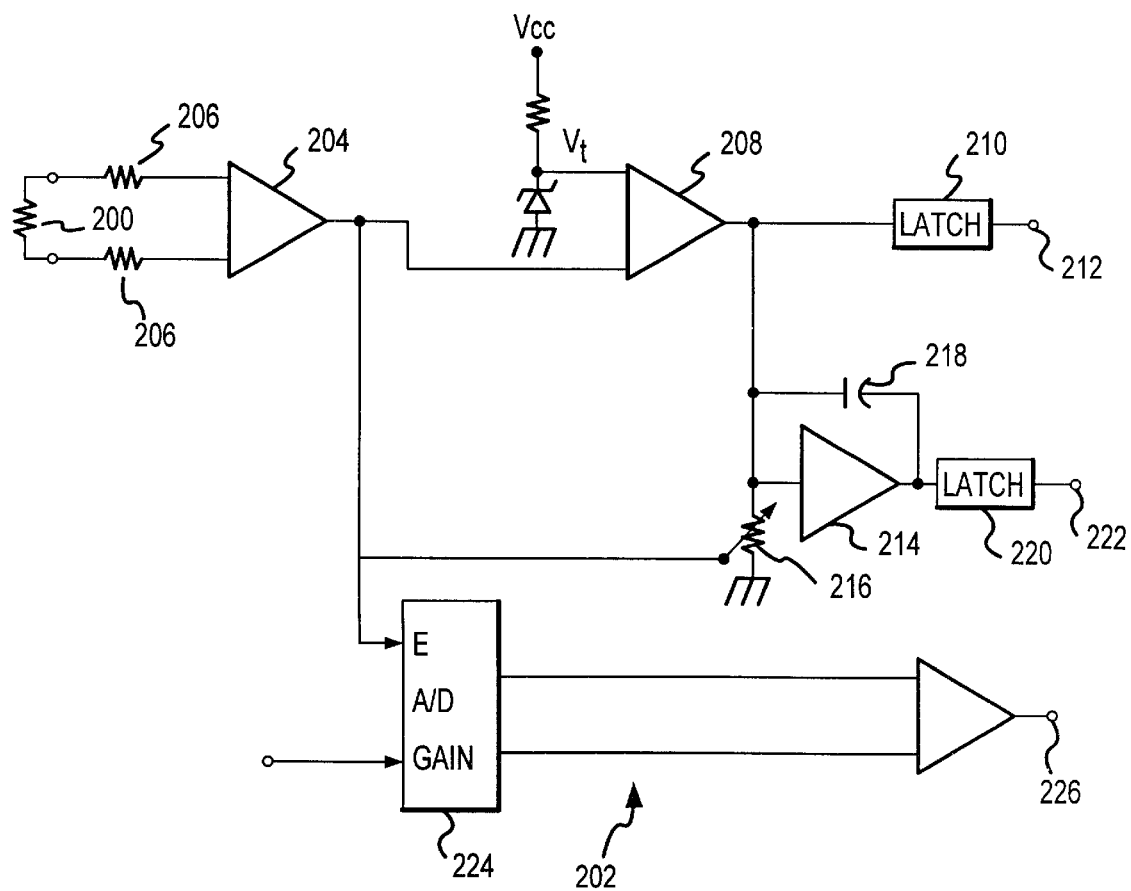
FIG. 4 is a schematic diagram of the electrical over stress detector in accordance with a preferred embodiment of the present invention.

A more detailed schematic of the EOS detector circuit 202 portion of the preamplifier 132 in the read/write channel 146 is shown in FIG. 4. The EOS detector circuit 202 basically monitors the magnitude of the signal output of the readers 156, the duration and frequency of the signals and determines the energy of the signals. The circuit 202 in accordance with the present invention monitors current signals between the preamplifier reader 156 and the transducer 200 and includes an amplitude section, a duration section, a frequency section, and an alarm section. The amplitude section has a comparator for detecting when a signal exceeds a predetermined voltage level. The duration section measures the time period that the comparator has an output signal. The frequency section measures the frequency of occurrence of comparator output signals. Each of the sections provides an input to the alarm section which provides an alarm signal condition if the amplitude section magnitude is too high, or the duration times amplitude is too high, or the frequency of occurrences of events is too high.

Specifically, the MR or GMR transducer 200 is connected to the input of a wide band amplifier 204 via isolation resistors 206. The output of the wide band amplifier is fed to one input of a comparator 208. The other input of the comparator 208 provides a reference voltage ($V_t$). This voltage $V_t$ is determined by the transducer physics. It represents the maximum amplitude that may safely appear across the MR or GMR device. This is the amplitude section.

The output of the comparator 208 feeds a latch circuit 210. Normally there will be no output on the comparator 208. However, should the comparator 208 switch on due to signal amplitude exceeding $V_t$, then the comparator 208 will feed the signal to the latch circuit 210. The output of the latch 210 can be connected to a temporary, test purposes only circuit at point 212 that may be used in the manufacturing process of recording device so that it can sound an audio alarm, cause an LED to flash, or initiate a safety shutdown procedure. This is the amplitude section.

The comparator 208 output also provides the duration information of the potentially offending signal. The comparator 208 output provides an input to an integrator circuit 214 which has its time constant varied by the combination of variable resistance 216 and capacitor 218. The amplitude signal output of the wide band amplifier 204 is used to vary the time constant of the integrator circuit 214 in order that the integrator circuit 214 can measure the overall power of an incoming pulse from the transducer 200. Once the integrator output reaches a predetermined threshold, a second latch circuit 220 is activated and can be hooked via pin 222 to an alarm circuit to provide immediate indication that the MR or GMR element has been damaged. Thus this is the duration section.

The output of the wide band amplifier 204 is also connected to one input to an Analog to Digital converter (A/D) 224 which can modify the bias requirements for each different MR or GMR device used to compensate for GMR resistance differences. The other input of the A/D converter 224 is a bias voltage unique to the GMR or MR transducer being used. The eight bit output of the converter 224 can be captured via pin 226 to a hold register designed to retain the highest value received for each GMR device as well as the transducer address.

The output warning provided by the comparator 208 provided on pin 212 can be used during manufacture and test to warn of potentially harmful conditions that, if the unit is installed, might lead to failures. The integrator circuit 214 provides an absolute damage output on pin 222. This can be used to reject a drive immediately. The highest value information, provided on pin 226 provides a record of the highest value received for each MR or GMR device installed. The circuit 202 in accordance with the present invention is preferably integrated into the integrated circuit 132 as shown in FIG. 3, although the circuit 202 may be added or retrofitted to a conventional preamplifier circuit already manufactured. As shown in FIG. 3, the EOS circuit pins 212, 222, and 226 may be connected into a controller 228 and the controller 228 may then provide an alarm output on pin 230 which can be queried for the individual alarms and thresholds and affected head address.

In summary, the present invention may be viewed as an electrical over stress detection circuit (such as 202) for detecting an over stress condition for a read/write transducer (such as 200) in a disc drive (such as 100) during drive manufacture which could adversely affect the read/write transducer (such as 200) in the disc drive after drive manufacture. The circuit basically has a reference voltage (such as $V_r$), an amplifier (such as 204) in a read/write preamplifier (such as 132) connected to the transducer (such as 200) and to a comparator (such as 208). The comparator (such as 208) is connected to the reference voltage (such as $V_r$) such that the comparator (such as 208) provides an output if the amplifier output exceeds the reference voltage (such as $V_r$).

The circuit further preferably has an integrator (such as 214) that has an input connected to the comparator output for providing an alarm output signal. The circuit alarm signal is preferably connected to a latch (such as 220). The circuit amplifier (such as 204) is also connected to a variable resistance (such as 216) that is connected to the input of the integrator (such as 214) so as to vary the time constant of the integrator (such as 214). The amplifier (such as 204) output is also connected through an analog to digital converter (such as 224) to a hold register for storing a signal magnitude and source address of the offending transducer. The transducer (such as 200) is preferably a giant magnetoresistive element. The integrator (such as 214) has one input connected to the comparator (such as 208) output for providing an alarm output signal. The alarm output signal of the integrator (such as 214) is connected to a latch (such as 220). The amplifier (such as 204) is further preferably connected to a variable resistance (such as 216) connected to the input of the integrator (such as 214) to vary a time constant of the integrator (such as 214). The amplifier (such as 204) output is also connected through an analog to digital converter (such as 224) to a hold register for storing a signal magnitude and source address for the giant magnetoresistive transducer (such as 200).

Stated another way, the present invention is a preamplifier integrated circuit (such as 132) for use in a disc drive assembly (such as 100) to amplify a read signal transmitted by a magnetoresistive transducer(such as 200). The circuit (such as 202) has an amplifier (such as 204) adapted to be connected to the transducer (such as 200) and to a reference voltage (such as $V_r$), a comparator (such as 208) connected to the amplifier (such as 204) and to the reference voltage (such as $V_r$) wherein the comparator (such as 208) provides an output if the amplifier output exceeds the reference voltage (such as $V_r$). The circuit (such as 202) may also have an integrator (such as 214) that has an input connected to the comparator (such as 208) output for providing an alarm output signal. The alarm output signal of the integrator (such as 214) is connected to a latch (such as 220).

The amplifier (such as 204) is also connected to a variable resistance (such as 216) connected to the input of the integrator (such as 214) to vary a time constant of the integrator and the amplifier output is connected through an analog to digital converter (such as 224) to a hold register for storing a signal magnitude and source address of the head which produced the signal.

Stated still another way, the present invention may be viewed as a disc drive (such as 100) that has a rotating disc (such as 108) and an actuator assembly (such as 110) adjacent the rotating disc for moving a head (such as 118) carrying a transducer (such as 200) over the disc (such as 108) to read and write digital data from and to the disc, and a preamplifier circuit (such as 132) connected to the transducer (such as 200). The disc drive has an electrical over stress detector circuit (such as 202) in the preamplifier circuit (such as 132) that has an amplifier (such as 204) connected to the transducer (such as 200) and to a reference voltage (such as $V_r$). A comparator (such as 208) is connected to the amplifier (such as 204) and to the reference voltage (such as $V_r$) wherein the comparator (such as 208) provides an output if the amplifier output exceeds the reference voltage (such as $V_r$). The disc drive (such as 100) also has an integrator (such as 214) in the detector circuit (such as 202) having an input connected to the comparator (such as 208) output for providing an alarm output signal (such as 222) if the duration of the comparator output exceeds a predetermined value depending on the magnitude of the amplifier (such as 204) output. This is accomplished by having the amplifier (such as 204) in the detector circuit (such as 202) connected to a variable resistance (such as 216) which is connected to the input of the integrator (such as 214) to vary a time constant of the integrator (such as 214). The transducer (such as 200) is preferably a magnetoresistive transducer or a giant magnetoresistive transducer.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, the circuit of the present invention may be utilized in any application in which a voltage sensitive devices such as GMR technology is utilized. More broadly, the circuit may be utilized to monitor conditions for any extremely thin film device which is sensitive to electronic over stress conditions to warn and detect such conditions. Accordingly all such variations are encompassed in the spirit of the invention disclosed and as defined in the appended claims.

What is claimed is:

1. An electrical over stress detection circuit for detecting an over stress condition for a transducer in a data storage device during device manufacture which could adversely affect the read/write transducer in the device after device manufacture, the circuit comprising:

a reference voltage; and an amplifier in a transducer preamplifier connected to the transducer and to a comparator, the comparator being connected to the reference voltage and to an output of the amplifier wherein the comparator provides a first output state if the amplifier output does not exceed the reference voltage, and provides a second output state indicating an over stress condition if the amplifier output exceeds the reference voltage.

2. The circuit according to claim 1 further comprising an integrator having an input connected to the comparator output for providing an alarm output signal.

3. The circuit according to claim 2 wherein the alarm output signal of the integrator is connected to a latch.

4. The circuit according to claim 3 wherein the amplifier is also connected to a variable resistance connected to the input of the integrator to vary a time constant of the integrator.

5. The circuit according to claim 1 wherein the amplifier output is connected through an analog to digital converter to a hold register for storing a signal magnitude and source address.

6. The circuit according to claim 1 wherein the transducer is a giant magnetoresistive transducer.

7. The circuit according to claim 6 further comprising an integrator having an input connected to the comparator output for providing an alarm output signal.

8. The circuit according to claim 7 wherein the alarm output signal of the integrator is connected to a latch.

9. The circuit according to claim 8 wherein the amplifier is further connected to a variable resistance connected to the input of the integrator to vary a time constant of the integrator.

10. The circuit according to claim 6 wherein the amplifier output is connected through an analog to digital converter to a hold register for storing a signal magnitude and source address for the giant magnetoresistive transducer.

11. A disc drive having a rotating disc and an actuator assembly adjacent the rotating disc for moving a transducer over the disc to read and write digital data from and to the disc, and a preamplifier circuit connected to the transducer, the disc drive comprising:

an electrical over stress detector circuit having an amplifier connected to the transducer and to a reference voltage, and a comparator connected to the amplifier and to the reference voltage wherein the comparator provides a first output state if the amplifier output does not exceed the reference voltage, and provides a second output state indicating an over stress condition if the amplifier output exceeds the reference voltage.

12. The disc drive according to claim 11 further comprising an integrator in the detector circuit having an input connected to the comparator output for providing an alarm output signal.

13. The disc drive according to claim 12 wherein the transducer is a giant magnetoresistive transducer.

14. The disc drive according to claim 13 wherein the amplifier in the detector circuit is connected to a variable resistance connected to the input of the integrator to vary a time constant of the integrator.

15. A disc drive having a rotating disc and an actuator assembly adjacent the disc operable to move a transducer over the disc to read and write digital data from and to the disc, the disc drive comprising:

a preamplifier circuit connected to the transducer for amplifying read signals from the transducer; and an electrical over stress detector means connected in the preamplifier circuit for sensing an over stress condition that could compromise operation of the transducer in the disc drive, the over stress detector means comprising a comparator, wherein the comparator provides a first output state in the absence of an over stress condition and provides a second output state to indicate an over stress condition.

* * * * *